United States Patent
Nelson et al.

(10) Patent No.: US 8,411,907 B2
(45) Date of Patent: Apr. 2, 2013

(54) DEVICE FUNCTION MODIFICATION METHOD AND SYSTEM

(75) Inventors: Mark A. Nelson, Poughkeepsie, NY (US); Kevin H. Peters, Germantown, NY (US); Louis R. Ruggiero, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 12/815,675

(22) Filed: Jun. 15, 2010

(65) Prior Publication Data

US 2011/0305375 A1 Dec. 15, 2011

(51) Int. Cl.
*G06K 9/00* (2006.01)

(52) U.S. Cl. .......... 382/115; 250/239; 250/206; 351/49; 351/44; 351/165; 351/158

(58) Field of Classification Search ............... 382/115; 250/239, 206; 351/49, 44, 158, 165
See application file for complete search history.

(56) References Cited

U.S. PATENT DOCUMENTS

| | | | |
|---|---|---|---|
| 5,015,086 A | 5/1991 | Okaue et al. | |
| 6,760,080 B1 | 7/2004 | Moddel et al. | |
| 6,853,303 B2 * | 2/2005 | Chen et al. | 340/573.1 |
| 7,374,282 B2 | 5/2008 | Tendler | |
| 2002/0130961 A1 * | 9/2002 | Lee et al. | 348/333.03 |
| 2007/0177794 A1 | 8/2007 | Gu | |
| 2009/0147215 A1 | 6/2009 | Howell et al. | |
| 2009/0317773 A1 | 12/2009 | Chapman et al. | |

FOREIGN PATENT DOCUMENTS

| | | |
|---|---|---|
| CN | 1606029 | 4/2005 |
| CN | 1607537 | 4/2005 |
| CN | 101009557 | 8/2007 |
| CN | 101352039 | 1/2009 |
| EP | 1674975 | 6/2006 |
| JP | 55076324 | 6/1980 |
| JP | 2007072627 | 3/2007 |

OTHER PUBLICATIONS

Kim et al.; Face Recognition Incorporating Ancillary Information; Hindawi Publishing Corporation; EURASIP Journal on Advances in Signal Processing; vol. 2008, Article ID 312849, 11 pages, doi:10.1155/2008/312849.

* cited by examiner

*Primary Examiner* — Mike Rahmjoo
(74) *Attorney, Agent, or Firm* — Schmeiser, Olsen & Watts; Anna Linne

(57) ABSTRACT

A modification method and system. The method includes performing a computer processor of a computing system, a facial recognition process of an individual associated with a device. The computer processor retrieves from a detection device, eyewear detection data indicating that the individual is correctly wearing eyewear and tint detection data indicating that the eyewear comprises tinted lenses. In response, the computer processor analyzes results of the facial recognition process, the eyewear detection data, and the tint detection data. The computer processor modifies functions associated with the first device in response to results of the analysis.

18 Claims, 3 Drawing Sheets

DEVICE FUNCTION MODIFICATION METHOD AND SYSTEM

FIELD OF THE INVENTION

The present invention relates to a method and associated system modifying device functions based on data describing eyewear.

BACKGROUND OF THE INVENTION

Changing apparatus functionality typically comprises an inefficient process with little flexibility. Apparatus functionality is not typically dependent upon external issues. Using an apparatus without any regard to external issues may result in impeded functionality.

SUMMARY OF THE INVENTION

The present invention provides a method comprising: performing, a computer processor of a computing system, a facial recognition process of a first individual associated with a first device; retrieving, by the computer processor from a detection device, eyewear detection data indicating that the first individual is correctly wearing first eyewear; retrieving, by the computer processor from the detection device, tint detection data indicating that the first eyewear comprises tinted lenses; analyzing, by the computer processor, results of the facial recognition process, the eyewear detection data, and the tint detection data; and first modifying, by the computer processor in response to results of the analyzing, first functions associated with the first device.

The present invention provides a computing system comprising a computer processor coupled to a computer-readable memory unit, the memory unit comprising instructions that when enabled by the computer processor implement modification method, the method comprising: performing, the computer processor, a facial recognition process of a first individual associated with a first device; retrieving, by the computer processor from a detection device, eyewear detection data indicating that the first individual is correctly wearing first eyewear; retrieving, by the computer processor from the detection device, tint detection data indicating that the first eyewear comprises tinted lenses; analyzing, by the computer processor, results of the facial recognition process, the eyewear detection data, and the tint detection data; and first modifying, by the computer processor in response to results of the analyzing, first functions associated with the first device.

The present invention advantageously provides a simple method and associated system capable of changing apparatus functionality.

DETAILED DESCRIPTION OF THE INVENTION

Figure 1:
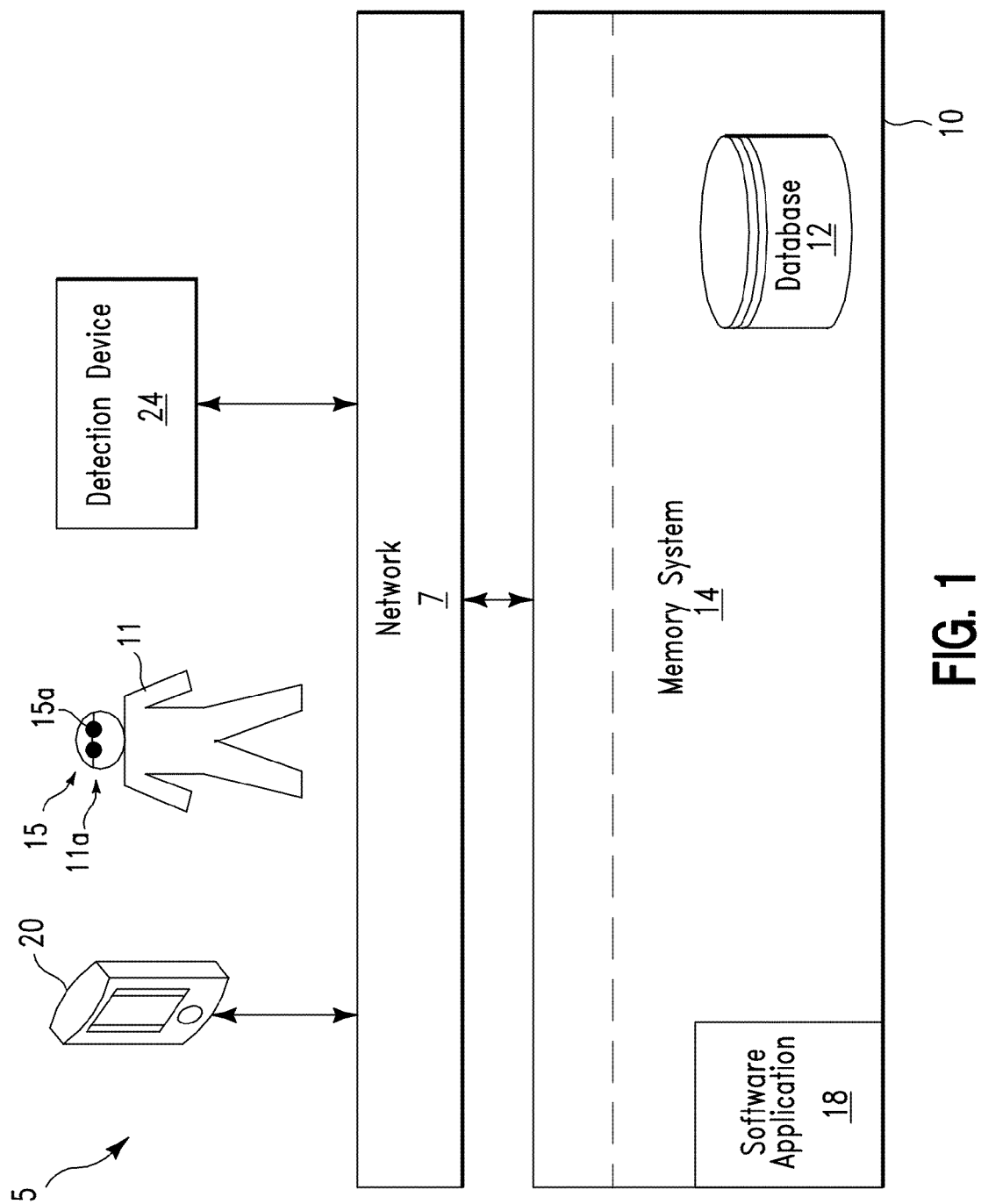
FIG. 1 illustrates a system for detecting eyewear on a user and modifying functions associated with a device, in accordance with embodiments of the present invention.

FIG. 1 illustrates a system 5 for detecting eyewear 15 on a user 11 and modifying functions associated with a device 20, in accordance with embodiments of the present invention. Device 20 may comprise any type of device comprising a display (e.g., liquid crystal display (LCD), light emitting diode display (LED), automotive dashboard display, a graphical user interface (GUI) display, etc) and optional backlighting for the display. For example, device 20 may comprise, inter alia, a cellular telephone, a computer, a personal digital assistant (PDA), an automotive dashboard, a television, an mp3 player, etc. Eyewear 15 may include any type of eyewear comprising tinted lenses 15a including, inter alia, sunglasses, welding glasses/goggles/shield, etc. System 5 enables a facial recognition process comprising:

1. Automatically detecting (continuously) that a user(s) is correctly wearing eyewear 15 (i.e., comprising tinted lenses 15a).
2. Automatically detecting (continuously) that the user(s) has recently put the eyewear on or taken the eyewear off.
3. Automatically execute actions (e.g., with respect to a display for a device such as device 20) based on results of steps 1 and 2. Actions may include adjusting, inter alia, a contrast/brightness of the display, a color of the display, a font size of characters on the display, reverse imaging for colors on the display, a backlighting of the display, etc.
   A. Executing actions may optionally include executing default actions based on a usage of the display and/or a typical color of tint associated with eyewear 15.
   B. Executing actions may optionally include executing an algorithm to determine a tint/color (associated with eyewear 15) by comparing a glass area differentiation from a background in order to determine the actions.
   C. Executing actions may optionally include detection of ambient lighting conditions and executing actions additionally based on the ambient lighting conditions.
4. Automatically use facial recognition to positively identify the user and execute the actions based on previously selected options with respect to eyewear 15 and device 20.

System 5 may enable a process for determining that user 11 is correctly wearing eyewear 15 by detecting a specified zone (on the face 11a) on the user. The specified zone may be determined by, inter alia, a triangulation process, a radar/optical process, etc.

System 5 of FIG. 1 comprises device 20 and detection device 24 connected through a network 7 to a computing system 10. Alternatively, device 20 and detection device 24 may be directly connected to computing system 10 without network 7. Additionally, device 20, detection device 24, and/or computing system 10 may be comprised by a same device (i.e., integral with each other). Detection device 24 may comprise any type of detection device capable of detecting:

1. Detecting that user 11 is correctly wearing (tinted) eyewear 15 (e.g., sunglasses are being worn over the user's eyes as opposed to being placed on the user's head).
2. Detecting that the user is facing a proper direction with respect to device 20 (e.g., the user is looking at device 20 as opposed to looking away from device 20).
3. Detecting a tint level and/or color of lenses 15a of eyewear 15.

Detection device 24 may comprise, inter alia, a camera or any other type of optical device, etc. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved and/or logged data. Software application 18 may enable an adjustment method (in response to detection of tinted eyewear 15) in accordance with the following example scenarios:

1. A first example comprises automatically adjusting dashboard backlighting in vehicle dashboard in order to prevent driver inattentiveness due to temporarily losing sight of dashboard instrumentation upon putting on or taking off eyewear 15 (i.e., comprising tinted lenses 15a). Software application 18 automatically adjusts the dashboard backlighting based on a tint level and/or color of the tinted lenses 15a.
2. A second example comprises automatically adjusting display functions (e.g., contrast/brightness, color, a font size of characters, reverse imaging for colors, backlighting, etc) for displays comprised by, inter alia, personal computers, personal digital assistants (PDA), cell phones, ATMs/kiosks, industrial equipment requiring special lenses, GPS devices, DVD and music players, etc. Software application 18 may select default actions associated with display functions (e.g., a complementary display color) based on a typical usage of device 20 resulting in a determination of a color of tinted lenses 15a in eyewear 15 (e.g., sunglasses). For example, different color schemes for tinted lenses 15a may be associated with different occupations (e.g., orange lenses may be used by pilots, boaters, fishermen, etc). Alternatively, a color of tinted lenses may be determined by an algorithm as described, infra.
3. A third example comprises automatically adjusting display functions associated with pulsing images/lighting. For example, some traffic lights/signals comprise a flashing mechanism (e.g., a flashing white strobe light) built into the light portion of the traffic light. The flashing mechanism; ensures that motorists are aware that they need to stop. System 5 enables a traffic light to systematically/sequentially pulse through multiple colors (e.g., on each side of the traffic light) if approaching driver(s) are wearing sunglasses.

System 5 may comprise the following components as described, infra:

1. An image capture device such as detection device 24. For example, the image capture device may be a camera. The image capture device may be built into device 20 or alternatively may be a part of a stand-alone device. The image capture device may comprise a plurality of image capture devices to monitor a specified area to determine if all individuals in an area are wearing eyewear 15. The image capture device(s) may control a single or multiple devices 20.
2. Computing system 10 comprising software application 18. Software application 18 may comprise the following components:
    A. A facial recognition program providing an ability to recognize a presence of a user's (e.g., user 15) face. Additionally, the facial recognition program may authenticate the user and store and recall unique preferences for the display functions of device 20. Facial recognition program additionally detects that the user is correctly wearing eyewear (e.g., eyewear 15) comprising tinted lenses 15a and that the eyewear is located in a proper location on the user's face (i.e., in front of the eyes and not around the neck or on top of the user's head). When the user is discovered correctly wearing the tinted eyewear, an action (i.e., changing display settings) to be taken will be transmitted to the display. When the tinted eyewear is removed, a restore action (i.e., restoring original settings for the display) is enabled and transmitted to the display.
    B. A facial scanning program providing an ability to utilize scanning technology. The facial scanning program may be local to the device (e.g., device 20) or provided by a remote source (e.g., computing system 10). Facial scanning program may generate a facial profile for the user based on past user changes to the display. The facial profile may be encrypted.
    C. An administration component to add/change/delete facial profiles or a default action to be taken. The administration component may be enabled locally through a GUI or by entering and/or responding to lighting/display settings. The administration component may be enabled remotely.
3. A database (e.g., database 12) comprising:
    A. Actions to be taken (e.g., changes to: contrast/brightness, color, a font size of characters, reverse imaging for colors, backlighting, etc). Additionally, an action (e.g., a reverse image signal to the display when sunglasses are worn) could be hardcoded in the facial recognition program.
    B. Facial profiles for the user(s).
4. Device 20 as described, infra.

The following implementation example for detecting tinted eyewear on a user and modifying display functions associated with a device is described as follows based on the following scenario:

In this scenario, a user uses the following display devices:
A. Automotive instrumentation with separate dash and sound system displays
B. A sound system display with an audio input adaptor.
C. An audio device such as an mp3 player.
D. A GPS device.
E. A cellular telephone.

The following steps describe the implementation example for detecting tinted eyewear on the user and modifying display functions for the aforementioned devices:

1. The user initiates a cell phone call inside a building therefore the cell phone display is placed in a normal display mode.
2. The user steps outside (into bright sunlight) and puts on sunglasses. The cell phone detects the user's sunglasses (and a tint level/color) and in response a keyboard for the cell phone is automatically illuminated and the display enables reverse imaging.
3. The user finishes the phone call and enters/starts his/her automobile.
4. The automobile's facial recognition program recognizes that the user is wearing sunglasses, authenticates the operator from a previous encounter (e.g., where the user adjusted a contrast of reverse imaging within n seconds of that putting on sunglasses while driving) and modifies the automobile dash instrumentation and sound system to the user's unique sunglass setting.
5. The user inserts/connects the audio device into audio input adaptor and in response, the sound system transmits a reverse image signal through the audio input adaptor thereby adjusting a display for the audio device.
6. The user turns on the GPS device. The GPS device is not enabled to self adjust its display so therefore the user cannot see the screen (i.e., with sunglasses on)

7. In response to step 6, the user lifts his/her sunglasses to read the GPS display.
8. In response to the user lifting up his/her sunglasses, the automobile dash instrumentation display, the sound system display, and the display for the audio device each return to normal display mode (i.e., since the continuous monitoring detected a face without sunglasses).
9. After viewing the GPS display, the user puts his/her sunglasses back on.
10. In response, the automobile dash instrumentation display, the sound system display, and the display for the audio device each return to the user's unique sunglass settings.
11. The user drives and later stops/shuts off the automobile and exits.
12. In response, the automobile dash instrumentation display, the sound system display, and the display for the audio device each return to a normal display mode.

Figure 2:
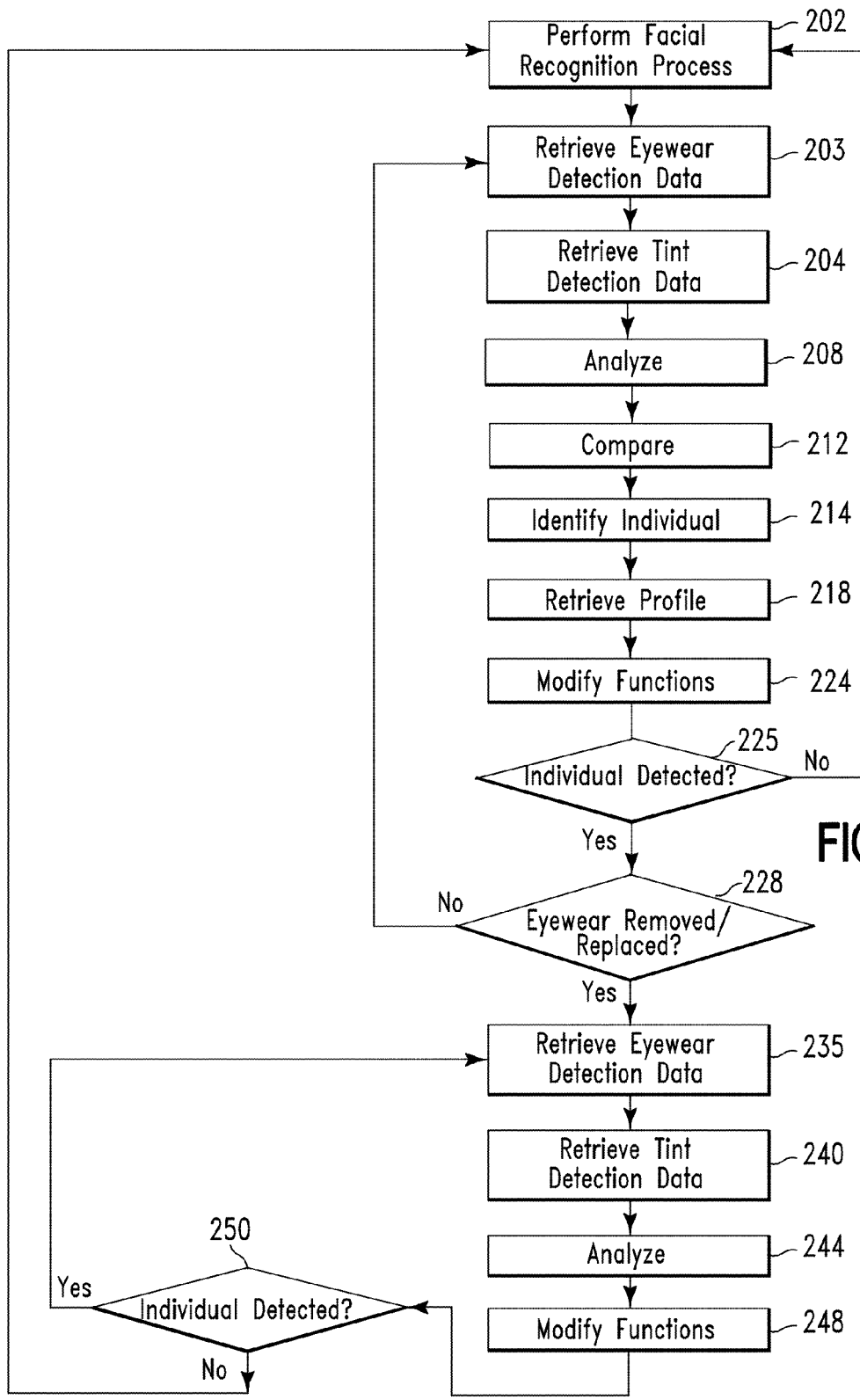
FIG. 2 illustrates a flowchart describing an algorithm used by the system of FIG. 1 for detecting eyewear on a user and modifying functions associated with a device, in accordance with embodiments of the present invention.

FIG. 2 illustrates a flowchart describing an algorithm used by system 5 of FIG. 1 detecting eyewear 15 on a user 11 and modifying functions associated with a device 20, in accordance with embodiments of the present invention. In step 202, a computer processor of a computing system (e.g., computing system 10 of FIG. 1) performs a facial recognition process of an individual (e.g., user 11 in FIG. 1) associated with a device (e.g., device 20 in FIG. 1). The facial recognition process may include determining that the eyewear is located within a specified zone on the individual's face. In step 203, the computer processor retrieves (i.e., from a detection device such as detection device 24 in FIG. 1) eyewear detection data indicating that the individual is correctly wearing eyewear. In step 204, the computer processor retrieves (from the detection device) tint detection data indicating that the eyewear comprises linted lenses 15a. In step 208, the computer processor analyzes results of the facial recognition process, the eyewear detection data, and the tint detection data. The analysis may include:
1. Determining a tint level and a tint color associated with the linted lenses 15a.
2. Comparing the tint level and the tint color to a tint profile and determining that the tint level and the tint color comprise a standard tint level and standard tint color for usage with the device.
3. Comparing the tint level and the tint color to current background lighting.

In step 212 the computer processor (optionally) compares identification data to an image of the individual generated during the facial recognition process. In step 214, the computer processor identifies (i.e., in response to results of the comparison of step 212) the individual. In step 218, the computer processor retrieves a profile associated with the individual. The profile includes past modification settings associated with the individual and the device. In step 224, the computer processor (i.e., in response to results of the analysis of step 208 and optionally the profile) modifies functions associated with the device. The modified functions may include, inter alia, a contrast/brightness of a display of the device, a color of the display, a font size of characters on the display, reverse imaging for colors on the display, a backlighting of the display, etc. In step 225, the computer processor determines if the individual is still being detected (i.e., the individual is still located near the device). If in step 225, the computer processor determines that the individual is no longer being detected then step 202 is repeated to continue monitoring for another individual. If in step 225, the computer processor determines that the individual is still being detected then in step 228, the computer processor determines if the individual has removed/replaced the eyewear. If in step 228, the computer processor determines that the individual has not removed/replaced the eyewear then step 203 is repeated to continue monitoring.

If in step 228, the computer processor determines that the individual has removed/replaced the eyewear then in step 235, the computer processor retrieves (from the detection device) additional eyewear detection data indicating that the individual is correctly wearing eyewear differing from the original eyewear. In step 240, the computer processor retrieves additional tint detection data indicating that eyewear comprises linted lenses 15a differing from the original eyewear. In step 244, the computer processor analyzes the additional eyewear detection data and the additional tint detection data. In step 248, the computer processor (i.e., in response to results of analysis of step 244), modifies the functions associated with the first device. In step 250, the computer processor determines if the individual is still being detected (i.e., the individual is still located near the device). If in step 250, the computer processor determines that the individual is no longer being detected then step 202 is repeated to continue monitoring for another individual. If in step 250, the computer processor determines that the individual is still being detected then step 235 is repeated to continue monitoring.

Figure 3:
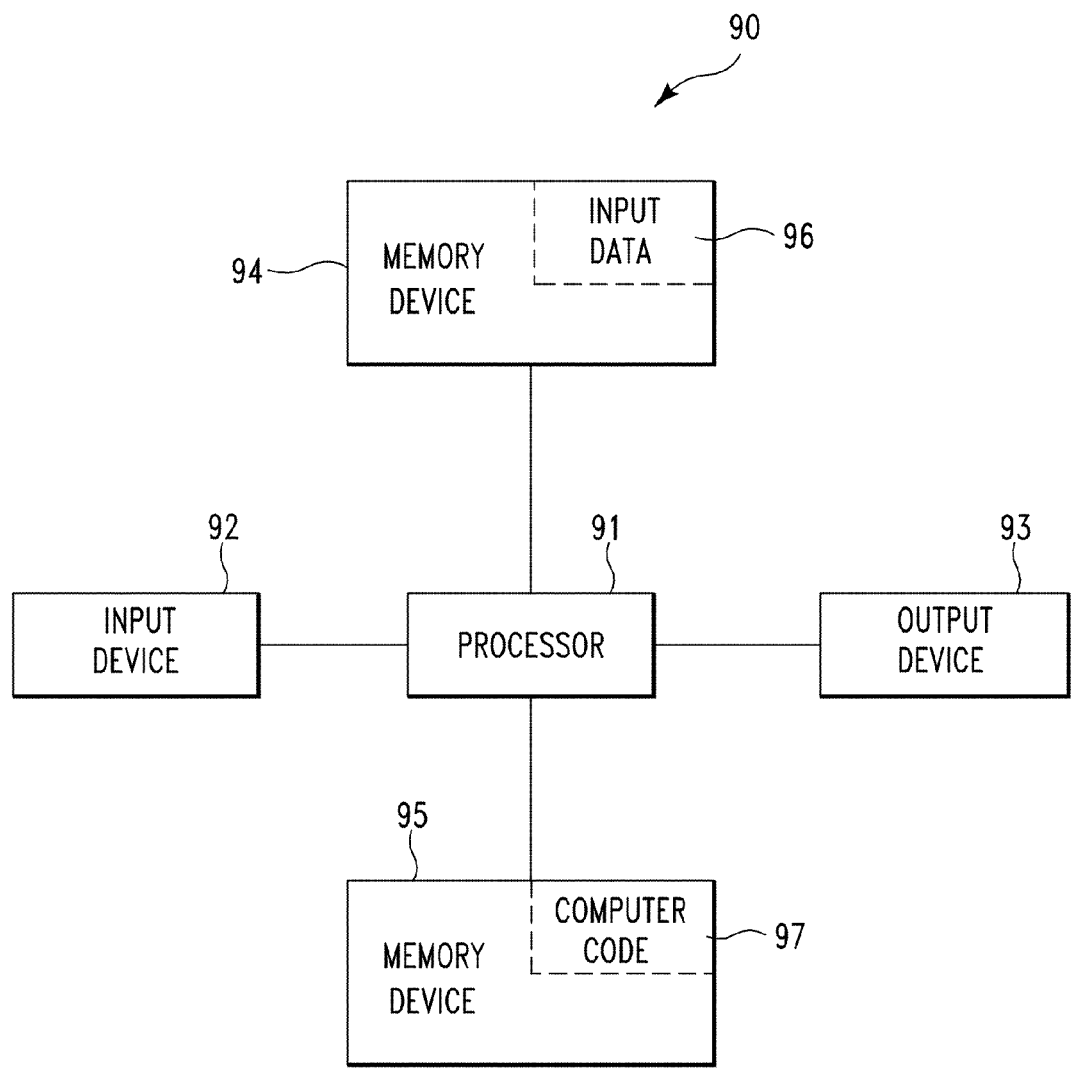
FIG. 3 illustrates a computer apparatus used for detecting eyewear on a user and modifying functions associated with a device, in accordance with embodiments of the present invention.

FIG. 3 illustrates a computer apparatus 90 (e.g., computing system 10 of FIG. 1) for detecting eyewear on a user and modifying functions associated with a device, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for detecting eyewear on a user and modifying functions associated with a device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to detect eyewear on a user and modify functions associated with a device. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for detecting eyewear on a user and modifying functions associated with a device. In another embodiment, the invention provides a method that performs the process steps of the invention on a subscription, advertising, and/or fee basis. That is, a service provider, such as a Solution Integrator, could offer to detect eyewear on a user and modify functions associated with a device. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
performing, a computer processor of a computing system, a facial recognition process of a first individual associated with a first device;
retrieving, by said computer processor from a detection device, eyewear detection data indicating that said first individual is correctly wearing first eyewear;
retrieving, by said computer processor from said detection device, tint detection data indicating that said first eyewear comprises linted lenses;
analyzing, by said computer processor, results of said facial recognition process, said eyewear detection data, and said tint detection data; and
first modifying, by said computer processor in response to results of said analyzing, first functions associated with said first device,
comparing, by said computer processor, identification data to an image of said first individual generated during said facial recognition process;
identifying, by said computer processor in response to results of said comparing, said first individual; and
retrieving, by said computer processor based on said identifying, a profile associated with said first individual, wherein said profile comprises past modification settings associated with said first individual and said first device, and wherein said first modifying said first functions is based on said user profile.

2. The method of claim 1, further comprising:
first device determining, by said computer processor in response to said results generated during said performing said facial recognition process and said eyewear detection data, that said first eyewear is located within a specified zone associated with said first individual.

3. The method of claim 1, wherein said analyzing said tint detection data further comprises determining a tint level and a tint color associated with said tinted lenses.

4. The method of claim 3, wherein said analyzing said tint detection data further comprises comparing said tint level and said tint color to a tint profile and determining that said tint level and said tint color comprise a standard tint level and standard tint color for usage with said first device.

5. The method of claim 3, wherein said analyzing said tint detection data further comprises comparing said tint level and said tint color to current background lighting.

6. The method of claim 1, wherein said first device comprises a display, and wherein said first modifying said functions comprises modifying specified functions selected from the group consisting of a contrast/brightness of said display, a color of said display, a font size of characters on said display, reverse imaging for colors on said display, and backlighting of said display.

7. The method of claim 1, further comprising:
first detecting, by said computer processor, that said first individual has removed said first eyewear; and
second modifying, by said computer processor in response to said first detecting, said first functions associated with said first device.

8. The method of claim 7, further comprising:
retrieving, by said computer processor from said detection device, additional eyewear detection data indicating that said first individual is correctly wearing second eyewear differing from said first eyewear;
retrieving, by said computer processor from said detection device, additional tint detection data indicating that said second eyewear comprises linted lenses differing from said first eyewear;
second analyzing, by said computer processor, said additional eyewear detection data and said additional tint detection data; and
third modifying, by said computer processor in response to results of said second analyzing, said first functions associated with said first device.

9. The method of claim 1, further comprising:
generating, by said computer processor, a report indicating said results of said first modifying; and
transmitting, by said computer processor to a safety regulator, said report.

10. The method of claim 1, further comprising:
providing at least one support service for at least one of creating, integrating, hosting, maintaining, and deploying computer-readable code in said computing system, wherein the code in combination the computer system performs: said disabling, said retrieving said first detection data, said retrieving said first safety gear detection data, said retrieving said first safety gear indication data, said analyzing, and said enabling.

11. A computer program product, comprising a non-transitory computer storage medium comprising a computer readable program code stored therein, said computer readable program code configured to perform the method of claim 1 upon being executed by said computer processor.

12. A computing system comprising a computer processor coupled to a computer-readable memory unit, said memory unit comprising instructions that when enabled by the computer processor implement modification method, said method comprising:
performing, said computer processor, a facial recognition process of a first individual associated with a first device;
retrieving, by said computer processor from a detection device, eyewear detection data indicating that said first individual is correctly wearing first eyewear;
retrieving, by said computer processor from said detection device, tint detection data indicating that said first eyewear comprises tinted lenses;

analyzing, by said computer processor, results of said facial recognition process, said eyewear detection data, and said tint detection data; and first modifying, by said computer processor in response to results of said analyzing, first functions associated with said first device, comparing, by said computer processor, identification data to an image of said first individual generated during said facial recognition process;

identifying, by said computer processor in response to results of said comparing, said first individual; and retrieving, by said computer processor based on said identifying, a profile associated with said first individual, wherein said profile comprises past modification settings associated with said first individual and said first device, and wherein said first modifying said first functions is based on said user profile.

13. The computing system of claim 12, wherein said method further comprises:

first device determining, by said computer processor in response to said results generated during said performing said facial recognition process and said eyewear detection data, that said first eyewear is located within a specified zone associated with said first individual.

14. The computing system of claim 12, wherein said analyzing said tint detection data further comprises determining a tint level and a tint color associated with said tinted lenses.

15. The computing system of claim 14, wherein said analyzing said tint detection data further comprises comparing said tint level and said tint color to a tint profile and determining that said tint level and said tint color comprise a standard tint level and standard tint color for usage with said first device.

16. The computing system of claim 14, wherein said analyzing said tint detection data further comprises comparing said tint level and said tint color to current background lighting.

17. The computing system of claim 12, wherein said first device comprises a display, and wherein said first modifying said functions comprises modifying specified functions selected from the group consisting of a contrast/brightness of said display, a color of said display, a font size of characters on said display, reverse imaging for colors on said display, and backlighting of said display.

18. The computing system of claim 12, wherein said method further comprises:

first detecting, by said computer processor, that said first individual has removed said first eyewear; and second modifying, by said computer processor in response to said first detecting, said first functions associated with said first device.

\* \* \* \* \*